US009886951B2

(12) United States Patent
Carbonell et al.

(10) Patent No.: US 9,886,951 B2
(45) Date of Patent: *Feb. 6, 2018

(54) ANALYSIS OF PROFESSIONAL-CLIENT INTERACTIONS

(71) Applicant: International Business Machines Corporation, Armonk, NY (US)

(72) Inventors: Lee A. Carbonell, Flower Mound, TX (US); Tsz S. Cheng, Grand Prairie, TX (US); Jeffrey L. Edgington, Keller, TX (US); Pandian Mariadoss, Allen, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/614,993

(22) Filed: Jun. 6, 2017

(65) Prior Publication Data

US 2017/0263246 A1 Sep. 14, 2017

Related U.S. Application Data

(63) Continuation of application No. 14/736,661, filed on Jun. 11, 2015.

(51) Int. Cl.
*G06F 17/28* (2006.01)
*G10L 15/197* (2013.01)
(Continued)

(52) U.S. Cl.
CPC ............ *G10L 15/197* (2013.01); *G06F 17/27* (2013.01); *G06F 17/30312* (2013.01);
(Continued)

(58) Field of Classification Search
None
See application file for complete search history.

(56) References Cited

U.S. PATENT DOCUMENTS 6,302,844 B1   10/2001   Walker et al.
6,741,967 B1*   5/2004   Wu .................. G06Q 30/02
                                                        705/1.1
(Continued)

FOREIGN PATENT DOCUMENTS

CN         102299946 A    12/2011

OTHER PUBLICATIONS

Angus et al., "Visualising Conversation Structure across Time: Insights into Effective Doctor-Patient Consultations", PloS One, 2012; 7(6): e38014, Published: Jun. 5, 2012, 16 pages, <https://doi.org/10.1371/journal.pone.0038014>.

(Continued)

*Primary Examiner* — Richard Zhu
(74) *Attorney, Agent, or Firm* — Adolph C. Bohnstedt (57) ABSTRACT

One or more processors receive recording data of a meeting between a professional and a client. One or more processors analyze the recording data to make one or more determinations. One or more processors identify one or more characteristics of the professional based on the one or more determinations. One or more processors match the one or more characteristics of the professional to one or more preferences of an individual seeking one or more professionals. One or more processors build a profile of the professional based on the one or more characteristics and store the profile in a database. One or more processors search the database for one or more profiles that provide a match of the one or more preferences of the individual seeking one or more professionals and display the one or more profiles.

1 Claim, 6 Drawing Sheets

(51) Int. Cl.
*G10L 15/22* (2006.01)
*G10L 25/57* (2013.01)
*G06F 17/27* (2006.01)
*G06Q 30/06* (2012.01)
*G06F 17/30* (2006.01)
*G10L 15/18* (2013.01)
*G10L 25/51* (2013.01)
*G10L 17/00* (2013.01)
*G10L 25/63* (2013.01)

(52) U.S. Cl.
CPC ... *G06F 17/30477* (2013.01); *G06Q 30/0627* (2013.01); *G10L 15/1807* (2013.01); *G10L 15/22* (2013.01); *G10L 25/57* (2013.01); *G06F 17/30* (2013.01); *G06F 17/30699* (2013.01); *G06F 17/30702* (2013.01); *G10L 15/1822* (2013.01); *G10L 17/005* (2013.01); *G10L 25/51* (2013.01); *G10L 25/63* (2013.01); *G10L 2015/227* (2013.01); *G10L 2015/228* (2013.01)

(56) References Cited

U.S. PATENT DOCUMENTS

| | | | |
|---|---|---|---|
| 7,752,060 | B2 | 7/2010 | Hicks et al. |
| 8,103,524 | B1 | 1/2012 | Rogers et al. |
| 8,140,368 | B2 | 3/2012 | Eggenberger et al. |
| 8,190,732 | B1 * | 5/2012 | Cooley ............... G06Q 30/08 705/26.3 |
| 8,346,863 | B2 | 1/2013 | Cheng et al. |
| 8,469,713 | B2 | 6/2013 | Kron et al. |
| 8,515,776 | B2 | 8/2013 | Schoenberg |
| 8,583,450 | B2 | 11/2013 | Baker et al. |
| 8,886,663 | B2 | 11/2014 | Gainsboro et al. |
| 9,270,778 | B1 | 2/2016 | Brown |
| 2003/0120517 | A1 | 6/2003 | Eida et al. |
| 2004/0015550 | A1 | 1/2004 | Nakamura |
| 2005/0165604 | A1 | 7/2005 | Hanazawa |
| 2006/0232426 | A1 | 12/2006 | Spears |
| 2008/0270123 | A1 | 10/2008 | Levanon et al. |
| 2009/0125814 | A1 | 5/2009 | Willcock |
| 2010/0114575 | A1 | 5/2010 | Itoh et al. |
| 2011/0196699 | A1 | 8/2011 | Schoenberg |
| 2011/0217021 | A1 | 9/2011 | Dubin et al. |
| 2012/0010904 | A1 | 1/2012 | Buck et al. |
| 2013/0006634 | A1 | 1/2013 | Grokop et al. |
| 2013/0041947 | A1 | 2/2013 | Sammon |
| 2013/0046542 | A1 | 2/2013 | Papakipos et al. |
| 2013/0101970 | A1 | 4/2013 | Mascarenhas |
| 2014/0025620 | A1 | 1/2014 | Greenzeiger et al. |
| 2014/0278455 | A1 | 9/2014 | Chandrasekaran et al. |
| 2014/0330566 | A1 | 11/2014 | Redfern |
| 2015/0348003 | A1 * | 12/2015 | Reader ............... G06Q 20/3224 705/16 |
| 2016/0239613 | A1 | 8/2016 | Siva |
| 2016/0364780 | A1 | 12/2016 | Carbonell et al. |
| 2016/0365091 | A1 | 12/2016 | Carbonell et al. |

OTHER PUBLICATIONS

Beni, Juliet Beatrice, "The Physician-Patient Interaction in Real-Time: Applying Continuous Response Measurement to the Medical Visit", Acceptance Date: 2012, pp. 1-106.

IBM Appendix P.: "List of IBM Patents or Patent Applications to be Treated as Related", Dated Jun. 6, 2017, 2 pages.

Greaves et al., "Use of Sentiment Analysis for Capturing Patient Experience From Free-Text Comments Posted Online", pp. 1-13, J Med Internet Res. Nov. 2013; 15(11): e239, Published online Nov. 1, 2013, doi: 10.2196/jmir.2721, <http://wwww.ncbi.nlm.nih.gov/pmc/articles/PMC3841376/?report=printable>.

IBM Appendix P.: "List of IBM Patents or Patent Applications to be Treated as Related", Dated Jul. 26, 2017, 2 pages.

Carbonell et al., "Analysis of Professional-Client Interactions", U.S. Appl. No. 15/659,786, filed Jul. 26, 2017, pp. 1-27.

* cited by examiner

ANALYSIS OF PROFESSIONAL-CLIENT INTERACTIONS

BACKGROUND OF THE INVENTION

The present invention relates generally to the field of artificial intelligence (AI), and more particularly to determining characteristics of individuals through natural language processing (NLP).

AI refers to the intelligence exhibited by machines or software. The field of study of AI focuses on the goal of creating intelligence. AI is used for logistics, data mining, medical diagnosis, and many other areas throughout the technology industry.

NLP is a field of computer science, artificial intelligence, and linguistics concerned with the interactions between computers and human (natural) languages. As such, NLP is related to the area of human-computer interaction. Many challenges in NLP involve natural language understanding, that is, enabling computers to derive meaning from human or natural language input.

SUMMARY

Embodiments of the present invention provide a method, system, and program product to analyze professional-client interactions. One or more processors receive recording data of a meeting between a professional and a client The recording data comprises one or both of: audio recording data and video recording data, and the recording data is received from one or more recording devices deployed in an environment in which the professional and the client are conversing. One or more processors analyze the recording data to make one or more determinations of one or more of: an amount of time spent in the meeting, an amount of time the professional spoke, an amount of time the client spoke, a conversational tone, a word content, a word context, a voice intonation, a voice cadence, a voice lilt, a voice inflection, a voice volume, a body language, and a facial expression. One or more processors identify one or more characteristics of the professional based on the one or more determinations. The one or more characteristics of the professional comprises that the professional is one or more of: a good listener, takes time with the client, is direct, uses complicated language, explains a complicated subject matter in layman terms, is talkative, is loud, and is quiet. One or more processors match the one or more characteristics of the professional to one or more preferences of an individual seeking one or more professionals. One or more processors build a profile of the professional based on the one or more characteristics. One or more processors store the profile of the professional in a database. One or more processors query the individual seeking one or more professionals for the one or more preferences of the individual seeking one or more professionals. One or more processors search the database for one or more profiles that provide a match of the one or more preferences of the individual seeking one or more professionals. One or more processors display the one or more profiles that match the one or more preferences of the individual seeking one or more professionals.

DETAILED DESCRIPTION

Embodiments of the present invention recognize that unstructured data concerning characteristics of professionals is challenging for the public to obtain. Embodiments of the present invention provide systems, methods, and computer program products for analyzing recording data to identify characteristics of professionals, and later use the identified information to match clients with professionals whose characteristics are likely to result in a satisfying professional relationship. The term "characteristics," as used herein, refers generally to qualities of an individual and can include, for example, whether the professional is a good listener, takes his or her time with a client, is direct and to the point, uses complicated language or explains complicated subject matter so that a layman can understand, etc.

There are numerous sources available for retrieving hard data about individuals who provide professional services to the public. Hard data includes structured information about a professional, such as educational background, public disputes, litigation, unprocessed comments posted on message boards by the public, etc. Individuals that provide professional services to the public (i.e., professionals) typically form lasting relationships with the public as a component of the services they provide (e.g., doctors, lawyers, financial consultants, etc.). Much publicly accessible hard data does not provide a searching client with the ability to ascertain whether he or she will personally enjoy interacting with a potential professional. For example, some members of the public may want their doctor to take a significant amount of time listening to them when they go for a check-up. Other individuals may rather have a doctor that is quick and business-like for routine appointments. In these examples, unstructured data, such as bedside manner, is challenging to ascertain, yet many individuals consider such personal interactions with their doctor to be an important component of the doctor-patient relationship.

Relationships that are considered important are not limited to doctor-patient relationships. For example, lawyers and financial consultants often form long-lasting relationships with their clients. In fact, members of the public may consider a lawyer-client or financial advisor-client relationship to be at least as important as the relationships they have with their doctors. In the context of this writing, an important professional-client relationship is any professional-client relationship that is important enough to the client to warrant, for example, a search of available databases prior to approaching the professional.

The present invention will now be described in detail with reference to the Figures.

Figure 1:
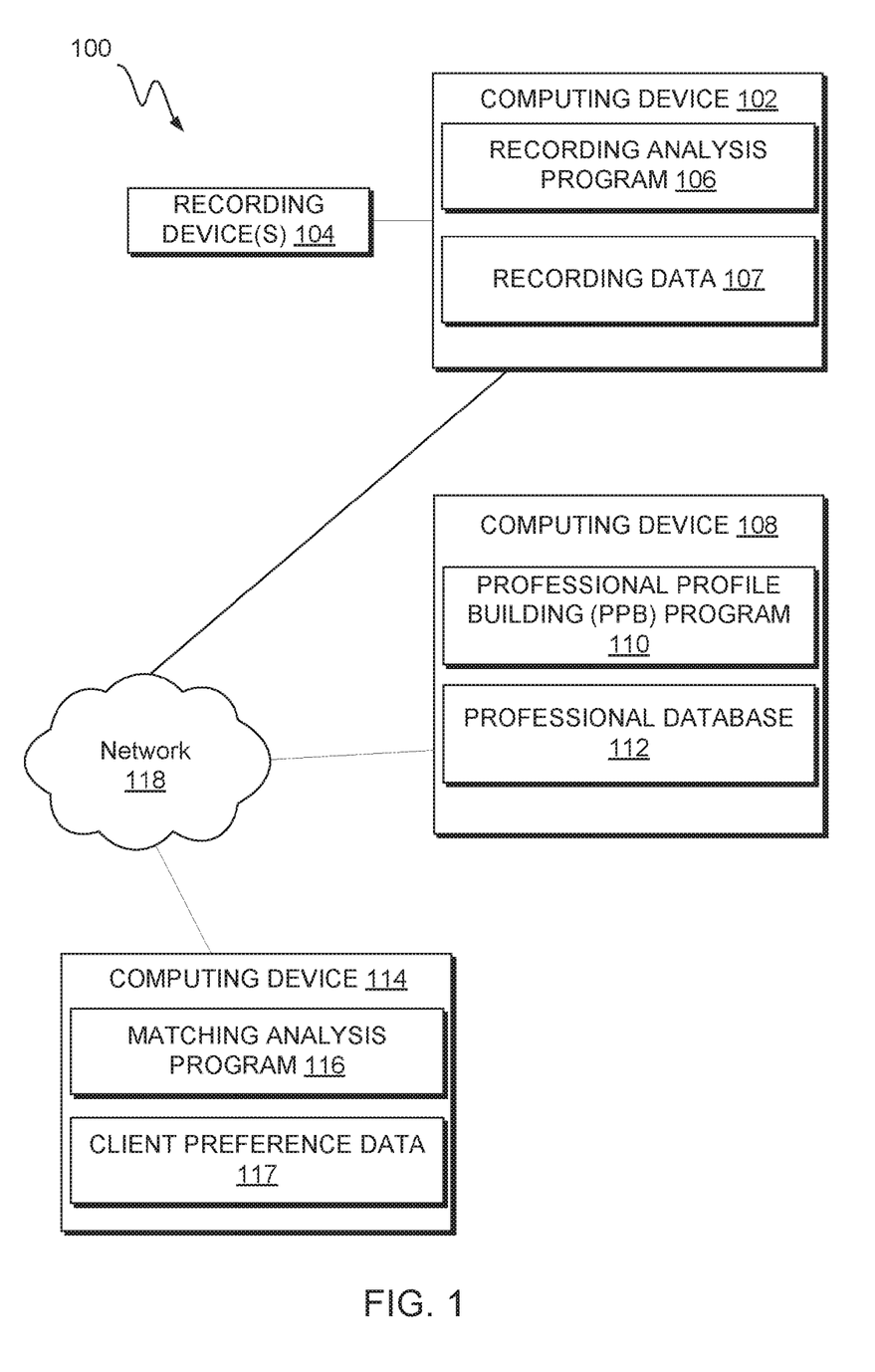
FIG. 1 is a functional block diagram illustrating an NLP and analysis environment, in accordance with an exemplary embodiment of the present invention.

FIG. 1 is a functional block diagram illustrating an NLP and analysis environment, generally designated 100, in accordance with an exemplary embodiment of the present invention. NLP and analysis environment 100 includes computing device 102, which is connected to recording device(s) 104. In this embodiment, NLP and analysis environment 100 also includes computing device 108 and computing device 114. In addition, computing devices 102, 108, and 114 are connected over network 118.

In various embodiments of the present invention, computing devices 102, 108, and 114 are computing devices that can be standalone devices, servers, laptop computers, tablet computers, netbook computers, personal computers (PCs), or desktop computers. In various embodiments, computing devices 102, 108, and 114 represent a computing system utilizing clustered computers and components to act as a single pool of seamless resources. In other embodiments, computing devices 102, 108, and 114 represent one or more computing devices. In general, computing devices 102, 108, and 114 can be any one computing device or a combination of devices with either remote or non-remote access to recording device(s) 104, recording data 107, professional database 112, and client preference data 117. Computing devices 102, 108, and 114 may include internal and external hardware components, as depicted and described in further detail with respect to FIG. 6.

In this exemplary embodiment, computing device 102 is connected (e.g., using one or more wired or wireless connections) to recording device(s) 104, and includes recording analysis program 106 and recording data 107. Recording analysis program 106 receives audio and/or audio-video data, collectively recording data 107, recorded by recording device(s) 104. Recording device(s) 104 can include, but are not limited to, analog and digital microphones and video recorders. In this exemplary embodiment, recording data 107 includes audio and/or audio-video data recorded during a meeting between two or more consenting individuals, including a professional and a client. For example, with full disclosure and consent from all parties, recording device(s) 104 can be deployed in a professional's office to capture professional-client discussions. In this exemplary embodiment, recording analysis program 106 can analyze recording data 107 to generate data about characteristics of the professional(s) in the meeting. Recording analysis program 106 can also generate data about characteristics of the client(s). In various embodiments, recording analysis program 106 pre-processes recording data 107 obtained from recording device(s) 104 to remove extraneous data (e.g., ambient noise, or, where only audio is desired, extraneous video data). In some embodiments, recording analysis program 106 parses recording data 107 to break down a dialogue between a professional and client into its constituent components. Recording analysis program 106 analyzes content of the parsed recording data 107. The analysis of the content provides insight into the characteristics of the professional when interacting with the client. Recording analysis program 106 transmits the identified characteristics data of the professional to PPB program 110.

Computing device 108 includes professional profile building (PPB) program 110 and professional database 112. In this exemplary embodiment, PPB program 110 receives data about characteristics of professionals generated by recording analysis program 106, and uses that data to build profiles for those professionals, which are stored in professional database 112. In some embodiments, PPB program 110 searches for and acquires additional data about professionals to be added to profiles such as educational backgrounds of the professionals, public disputes associated with the professionals, litigation involving the professionals, and comments posted on message boards by the public. Professional database 112 can be implemented with any desirable database architecture known in the art, such as a relational database, an object-oriented database, and/or one or more tables. In various embodiments of the present invention, professional database 112 can be hosted by computing device 108 and/or on one or more remote computing systems accessible via network 118.

Computing device 114 includes matching analysis program 116 and client preference data 117. In this exemplary embodiment, matching analysis program 116 matches one or more individuals that have provided client preference data 117 with the profiles of one or more professionals that are stored in professional database 112. In various embodiments, matching analysis program 116 provides a guided questionnaire to a client in order to obtain client preference data 117. Matching analysis program 116 searches professional database 112 for professional profiles that match the client preferences in client preference data 117. Matching analysis program 116 outputs one or more professional profiles from professional database 112 that match the client preferences in client preference data 117 within a given threshold. In various embodiments, the output professional profiles are ranked by how closely they match the client preferences in client preference data 117. In this manner, matching analysis program 116 can help potential clients find professionals with whom they are most compatible or with whom they are most likely to otherwise have satisfying client-professional relationships.

Network 118 can be, for example, a local area network (LAN), a wide area network (WAN) such as the Internet, or a combination of the two, and may include wired, wireless, fiber optic or any other connection known in the art. In general, network 118 can be any combination of connections and protocols that will support communications between one or more computing devices connected to recording device(s) 104 and containing recording analysis program 106, recording data 107, PPB program 110, professional database 112, matching analysis program 116, and client preference data 117, in accordance with a desired embodiment of the present invention.

Figure 2:
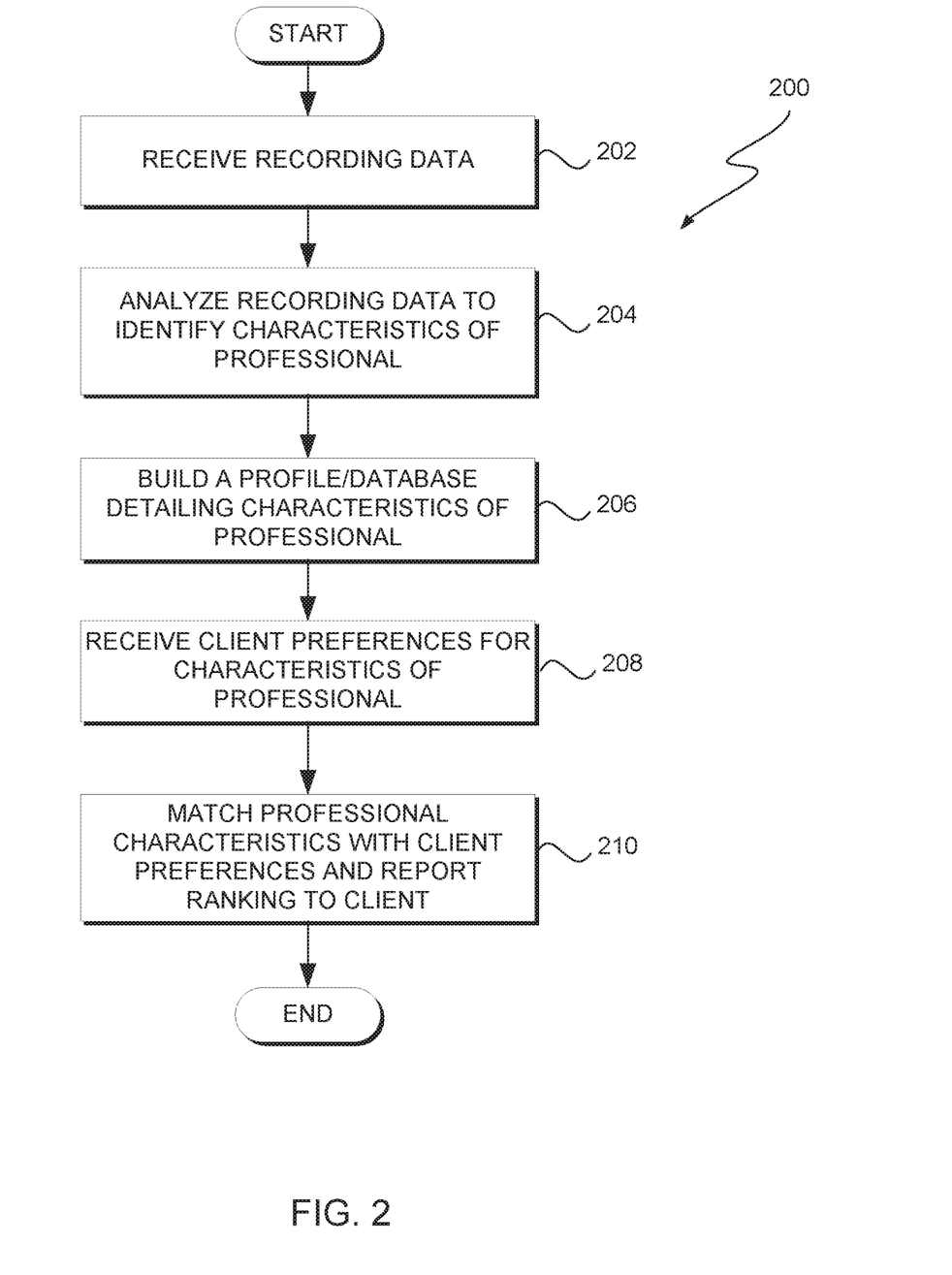
FIG. 2 illustrates operational processes for analyzing recording data to match professionals with clients, in accordance with an exemplary embodiment of the present invention.

FIG. 2 illustrates operational processes 200 for analyzing recording data to match professionals with clients, in accordance with an exemplary embodiment of the present invention.

In step 202, recording analysis program 106 receives recording data 107 from recording device(s) 104. In various embodiments, recording data 107 is one or both of audio and video data. In various embodiments, recording data 107 is received by recording analysis program 106 as a digital file such as a WAV, MP3, MOV, or AVI file. In other embodiments, recording analysis program 106 receives recording data 107 as analog data and converts the analog data to digital data. In various embodiments, recording device(s) 104 are deployed in an environment in which one or more individuals are conversing so as to capture conversation between those individuals. For example, recording device(s) 104 may be deployed in a medical office to record a conversation between a doctor and a patient. In another example, recording device(s) 104 may be deployed in a legal office to record a conversation between a lawyer and a client. In other embodiments, recording data 107 received from other sources. For example, audio and/or audio-video data can be recorded using other devices, apart from recording device(s) 104, and loaded onto computing device 102. In all cases, full disclosure and consent of all parties is obtained.

In step 204, recording analysis program 106 analyzes recording data 107 to identify characteristics of a professional when interacting with a client. Examples of characteristics that can be identified include, but are not limited to, whether the professional is one or more of: a good listener, talkative, loud, quiet, a person who speaks in simple language or uses complex terms, a person who takes time with the client or moves quickly and thereby potentially saves time, etc. In various embodiments, recording analysis program 106 identifies characteristics of the professional by analyzing content in recording data 107, such as one or more of: what individual words were used, word context, voice inflection, body language, facial expressions, volume of speech, voice tone, etc.

In step 206, PPB program 110 builds or adds to a profile for the professional whose characteristics have been identified by recording analysis program 106. PPB program 110 builds a profile for the professional if no profile yet exists for that professional. Otherwise, each additional analysis by recording analysis program 106 for the same professional is used to augment the existing profile of that professional. Publicly accessible hard data for the professional is optionally added and the profile for the professional is stored in professional database 112. These professional profiles may be compiled based on analysis of recording data 107 obtained from a few or many (e.g., hundreds, thousands, etc.) professional-client meetings. For example, entire networks of professionals and clients may agree to provide such data to improve professional-client matching.

In step 208, matching analysis program 116 receives client preference data 117. In various embodiments, matching analysis program 116 uses a guided questionnaire to obtain client preference data 117. In some embodiments, the client answers as many or as few questions as he or she wishes with the understanding that the more questions that are answered, the higher the likelihood that the client will be provided with one or more profiles of professionals with whom they are compatible.

In step 210, matching analysis program 116 uses the client preference data 117 to search professional database 112 for the closest professional profile matches based on a given threshold limit. Matching analysis program 116 sorts the one or more profiles and provides the sorted profiles to the client.

Figure 3:
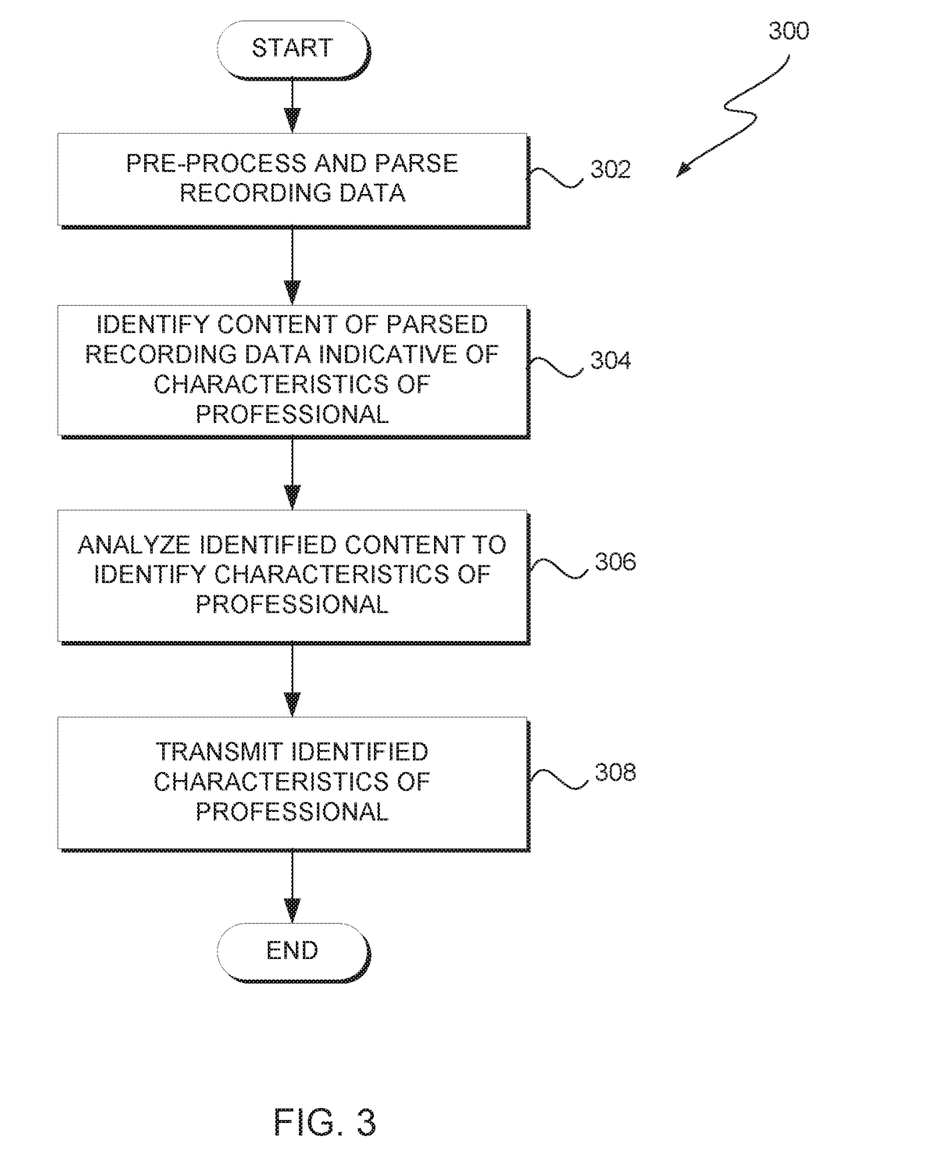
FIG. 3 illustrates operational processes for analyzing recording data to identify characteristics of a professional, in accordance with an exemplary embodiment of the present invention.

FIG. 3 illustrates operational processes 300 for analyzing recording data to identify characteristics of a professional, in accordance with an exemplary embodiment of the present invention. For example, operational processes 300 can be performed at step 204 of FIG. 2.

In step 302, recording analysis program 106 pre-processes and parses recording data 107. In various embodiments, recording analysis program 106 removes unneeded data from recording data 107 during pre-processing. For example, ambient background noise can be removed, leaving only the sound of voices. If recording data 107 includes video data, and recording analysis program 106 analyzes gestures of the participants in a meeting in an office, unnecessary data may include surrounding inanimate objects, such as office furniture. Similarly, if recording data 107 includes audio-video data and only audio data is desired, video data can be stripped out. In various embodiments, recording analysis program 106 performs speech recognition process during step 302, whereby spoken words are identified in recording data 107 and are converted to text.

In various embodiments, recording analysis program 106 extracts other information from recording data 107. Tasks performed during information extraction can include, for example, named-entity recognition (NER). NER involves locating and classifying elements in text into pre-defined categories such as the names of persons, organizations, locations, expressions of times, quantities, monetary values, percentages, etc. Once NER has been accomplished, the relationships between the entities can be determined, e.g., a building-location relationship is Empire State Building—New York City.

Recording analysis program 106 can also perform information extraction tasks such as part-of-speech tagging in which individual words are identified as nouns, verbs, adjectives, prepositions, adverbs, etc. Recording analysis program 106 also parses recording data 107, which typically involves breaking down generated text strings into component parts of speech with an explanation of the form, function, and syntactic relationship of each part.

In step 304, recording analysis program 106 identifies content of the pre-processed and parsed recording data 107 that is indicative of characteristics of the professional. In this exemplary embodiment, such content includes, but is not limited to, one or more of: i) the amount of time the professional spent with the client; ii) the amount of time the client spoke and the professional listened; iii) the amount of time the professional spoke and the client listened; iv) the conversational tone in terms of words used by one or both of the professional and client; v) the intellectual level of the professional's vocabulary; vi) the intonation, cadence, lilt, and/or inflection of one or both of the professional's voice and the client's voice; vii) the volume of one or both of the professional's voice and the client's voice; viii) the body language of one or both of the professional and client (i.e., where recording data 107 includes video); and ix) the facial expressions of one or both of the professional and client (i.e., where recording data 107 includes video). The content analyzed in step 304 provides insight into the characteristics of the professional that are of interest to potential clients searching for a professional.

In step 306, recording analysis program 106 analyzes the identified content to identify characteristics of the professional. For example, if a professional spends more time with clients on average than other professionals in the same field of endeavor typically do, then the professional may be appealing to potential clients searching for a professional who takes his or her time with a client. Alternatively, professional-searching clients who prefer quick appointments may not be interested in a professional who spends a large amount of time in appointments. If a professional spends a larger than average amount of time listening to clients speak, then the professional may appeal to professional-searching clients who seek a professional who is a good listener. On the other hand, such clients may be less satisfied with a professional who spends a larger than average amount of time speaking to clients, as opposed to listening to clients.

A professional typically conveys a certain conversational tone, depending on the words used in meetings with clients. In various embodiments, recording analysis program 106 analyzes the vocabulary used by a professional to determine the type of conversational tone the professional prefers. In various embodiments, recording analysis program 106 assigns the conversational tone to the professional for matching with potential clients. For example, clients who appreciate humor in a professional-client relationship may enjoy interacting with a professional who uses words with a light-hearted conversational tone. On the other hand, clients who seek a formal, serious relationship with a professional may ideally seek a professional who uses words conveying a formal, serious conversational tone. In various embodiments, recording analysis program 106 also analyzes the intellectual level of a professional's vocabulary when conversing with clients, and determines the extent to which the professional uses layman's terms. In various embodiments, recording analysis program 106 assigns the vocabulary intellectual level to the professional for matching with potential clients. For example, clients who have very little knowledge of a professional's field may want the professional to describe a topic in basic terms. Then again, clients who have an above-average knowledge of a professional's field may want the professional to describe a topic in more advanced terms. Data sources for terms and phrases used by recording analysis program 106 to parse recording data and identify characteristics of the professional, as discussed above, can be compiled manually and/or using libraries (e.g., commercial libraries) of such terms and phrases.

The intonation, cadence, lilt, and inflection of one or both of the professional's voice and the client's voice can also provide indications of the mood of the conversation and, hence, provide insight into the personality of the professional. In various embodiments, recording analysis program 106 analyzes the intonation, cadence, lilt, and inflection of one or both of a professional's voice and a client's voice, and includes these factors when characterizing the professional's personality. For example, clients seeking a professional who is quiet and laid-back may not enjoy interacting with a professional who has a rapid cadence, strong intonation, and strong inflection. On the other hand, clients who appreciate a take-charge professional may have more satisfying interactions with a professional who has such cadence, intonation, and inflection. The voice volume of one or both of a professional and a client during a meeting can also provide an idea of the mood or tone of the meeting. A loud or soft voice volume can also be an inherent characteristic of a professional. In various embodiments, recording analysis program 106 analyzes the voice volume of one or both of a professional and a client when they are in a meeting. Recording analysis program 106 includes the voice volume as a characteristic of the professional. For example, clients who prefer soft-spoken conversation may not enjoy interacting with a professional who has a loud voice. In contrast, clients who struggle to hear a soft voice may prefer a professional who has a clear, loud voice.

The body language of both a professional and a client can also provide insight into characteristics of a professional, such as the professional's demeanor. In various embodiments, where recorded data 107 includes video data, recording analysis program 106 analyzes the body language of one or both of the professional and the client when they are in a meeting. Recording analysis program 106 includes the results of the analysis to identify what kind of demeanor the professional exhibits. For example, clients who like a non-assertive demeanor in a professional may prefer a professional whose body language is not intimidating, or does not cause a client's body language to show intimidation. On the other hand, clients who like a strong, assertive demeanor in a professional may prefer a professional whose body language reflects those qualities.

In step 308, recording analysis program 106 transmits the characteristics identified in step 306 to PPB program 110.

Figure 4:
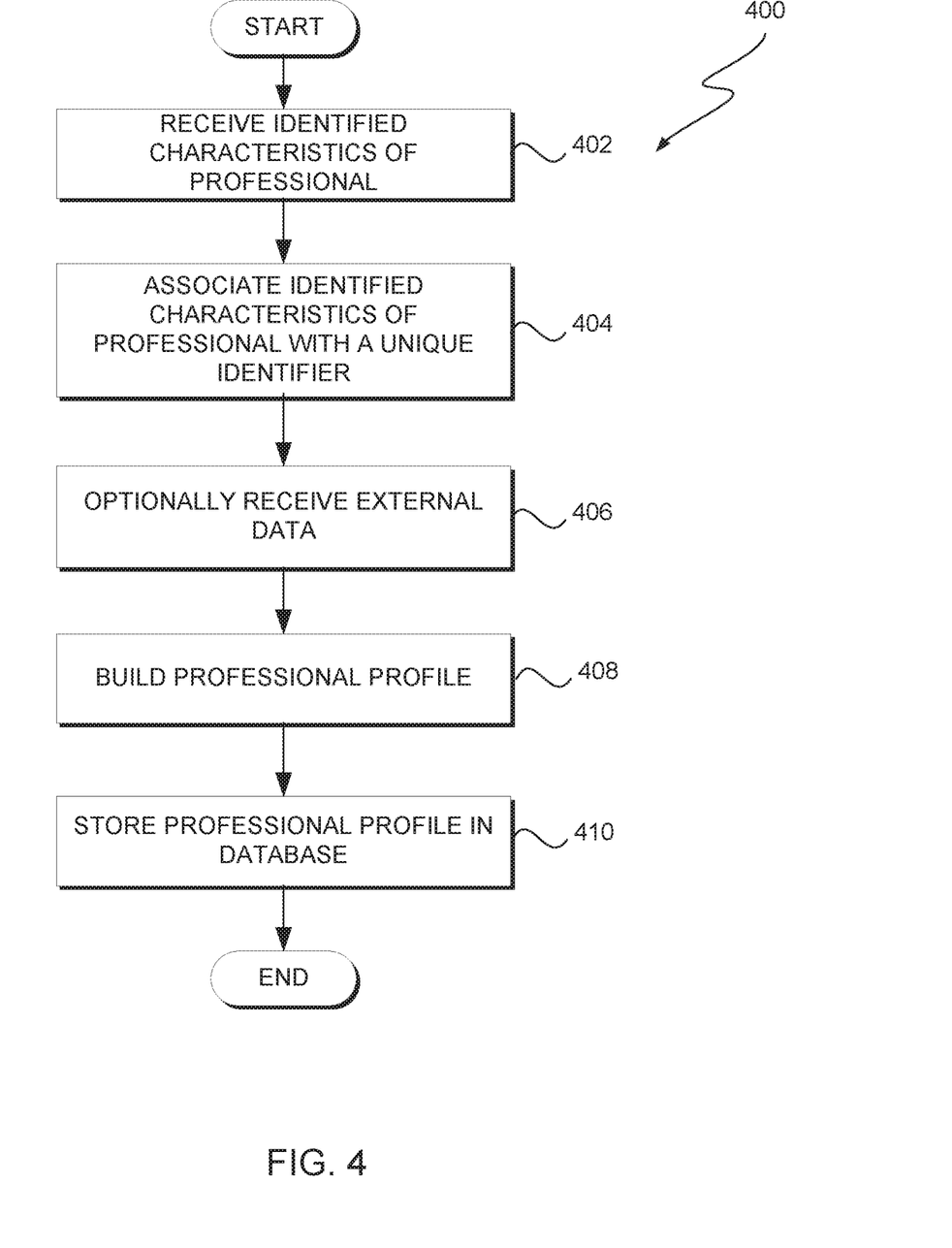
FIG. 4 illustrates operational processes for building a professional profile, in accordance with an exemplary embodiment of the present invention.

FIG. 4 illustrates operational processes 400 for building a professional profile, in accordance with an exemplary embodiment of the present invention. For example, operational processes 400 can be performed at step 206 of FIG. 2.

In step 402, PPB program 110 receives identified characteristics of a professional from recording analysis program 106.

In step 404, PPB program 110 associates (i.e., assigns) a unique identifier to the characteristics received for a particular professional. In one embodiment, the unique identifier is the name of the professional. In another embodiment, the unique identifier is some other identifier, which can be alphabetical, numeric, alphanumeric, or some other string of characters uniquely identifying the characteristics as belonging to the professional.

In step 406, PPB program 110 optionally receives external data to include in the professional's profile. In one embodiment, the external data includes hard data on the professional, such as educational background, public disputes, litigation, comments posted on message boards by the public, etc. In another embodiment, the external data includes unstructured data obtained via NLP analysis of data obtained from, for example, social network sites where the professional has been identified as a subject of a conversation. In this embodiment, recording analysis program 106 searches for unstructured data and performs NLP as discussed with respect to processing of recording data 107.

In step 408, PPB program 110 builds or adds to a professional profile for the professional, based on the data processed by recording analysis program 106, any external hard data, and any external unstructured data processed by recording analysis program 106.

In step 410, PPB program 110 stores the professional profile for the professional in professional database 112.

Figure 5:
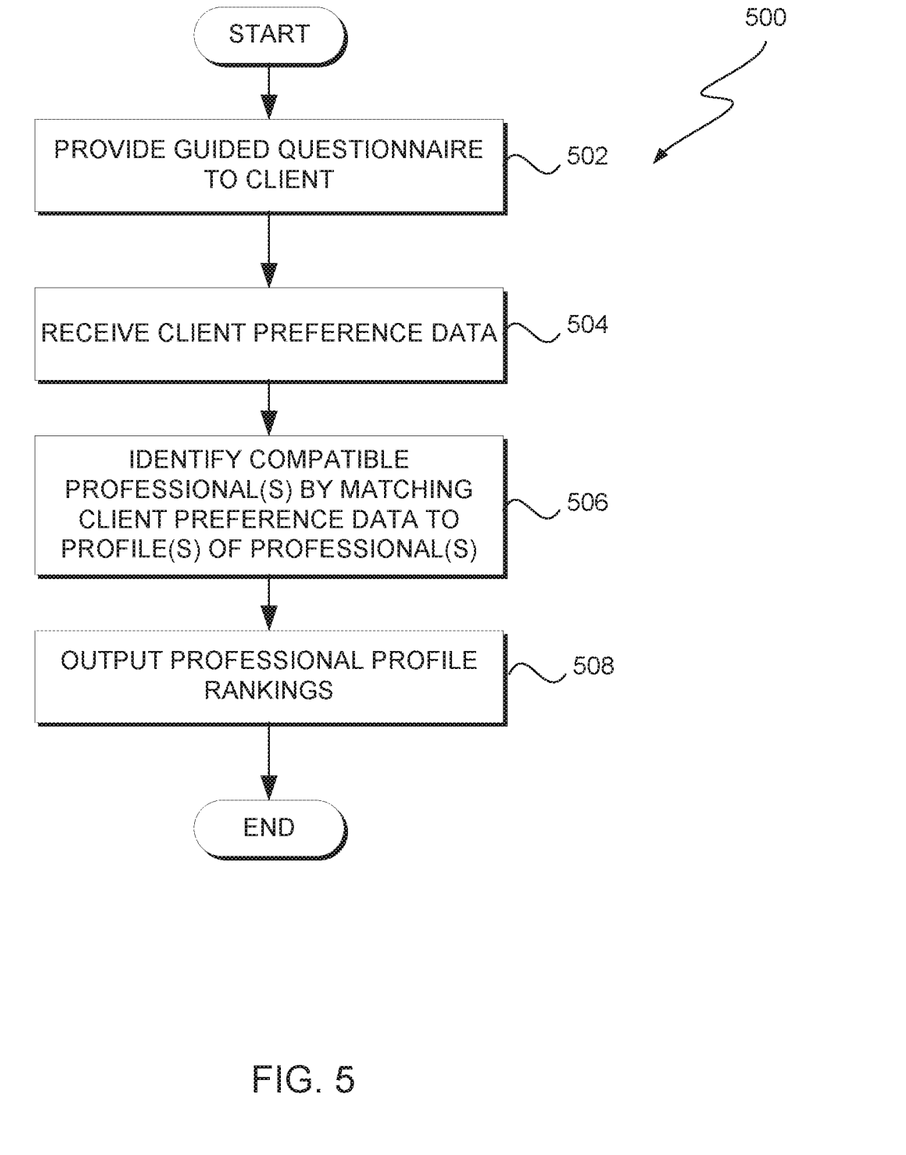
FIG. 5 illustrates operational processes for matching a professional with a client, in accordance with an exemplary embodiment of the present invention.

FIG. 5 illustrates detailed operational processes 500 for matching a professional with a client, in accordance with an exemplary embodiment of the present invention. For example, operational processes 500 can be performed at steps 208 and 210 of FIG. 2.

In step 502, matching analysis program 116 provides a guided questionnaire to a client in order to obtain client data that can be used to search professional database 112 for one or more best matching professionals for that client. In one embodiment, matching analysis program 116 asks questions that provide a searching client with the ability to answer the questions with various degrees of agreement (e.g., any desired ordinal scale). For example, the questions or statements in the guided questionnaire may be answered by selecting one of the following: i) disagree; ii) somewhat disagree; iii) neutral; iv) somewhat agree; and v) agree. An example of a statement in the guided questionnaire for a patient searching for a doctor is: "I prefer a doctor who takes his or her time during my visit." The answers as shown above are given a score by matching analysis program 116. For example, the selections shown above are given a numeric value between −2 and 2, e.g., disagree=−2, somewhat disagree=−1, neutral=0, somewhat agree=1, and agree=2. In one embodiment, the client answering the guided questionnaire can terminate the questionnaire at any point of their choosing, and matching analysis program 116 will use whatever data was collected to search professional database 112 for one or more best matching professionals.

In step 504, matching analysis program 116 receives client preference data 117. In one embodiment, client preference data 117 includes one or more scores that fit certain categories. For example, the individual searching for a doctor in the example above may select "agree," and matching analysis program 116 adds +2 to a category indicating a preference for long doctor visits. In various embodiments, client preference data 117 includes one or more categories that match categories that are present for professionals in professional database 112. The one or more categories are given weight by scores given to them by the client who fills out answers in the guided questionnaire. Using the patient-doctor example above, categories with larger positive numbers indicate increasing importance for the characteristic inherent to that category. Thus, a large positive number in a category that shows a preference for long doctor visits indicates that a searching, would-be patient considers that as an important characteristic and quality in doctors.

In step 506, matching analysis program 116 identifies one or more compatible professionals by matching client preference data 117 to professional profiles within professional database 112. In various embodiments, the professional profiles in professional database 112 contain weighted categories of various characteristics of the professionals described in the profiles. By filling out the guided questionnaire in step 502, the searching client adds weight to one or more categories within client preference data 117, the categories being identical to the categories found in the professional profiles. In one embodiment, matching analysis program 116 ranks the categories in client preference data 117 and searches for professional profiles in professional database 112 that rank those categories similarly, if not identically. In another embodiment, matching analysis program 116 selects a subset of the categories within client preference data 117, the subset of categories being the most highly weighted by the client. Matching analysis program 116 searches for profiles within professional database, wherein the same subset of categories are also the most highly weighted.

In step 508, matching analysis program 116 outputs one or more professional profiles to the client. In this exemplary embodiment, matching analysis program 116 outputs one or more professional profiles that most closely match the client's preferences, as delineated in client preference data 117. When two or more profiles closely match the client's preferences as indicated in client preference data 117, matching analysis program 116 provides a ranked list of professional profiles to the client. One with ordinary skill in the art would recognize that there are a several methods for ranking profiles, hence, further discussion of methods in which professional profiles may be ranked will not be addressed here.

Figure 6:
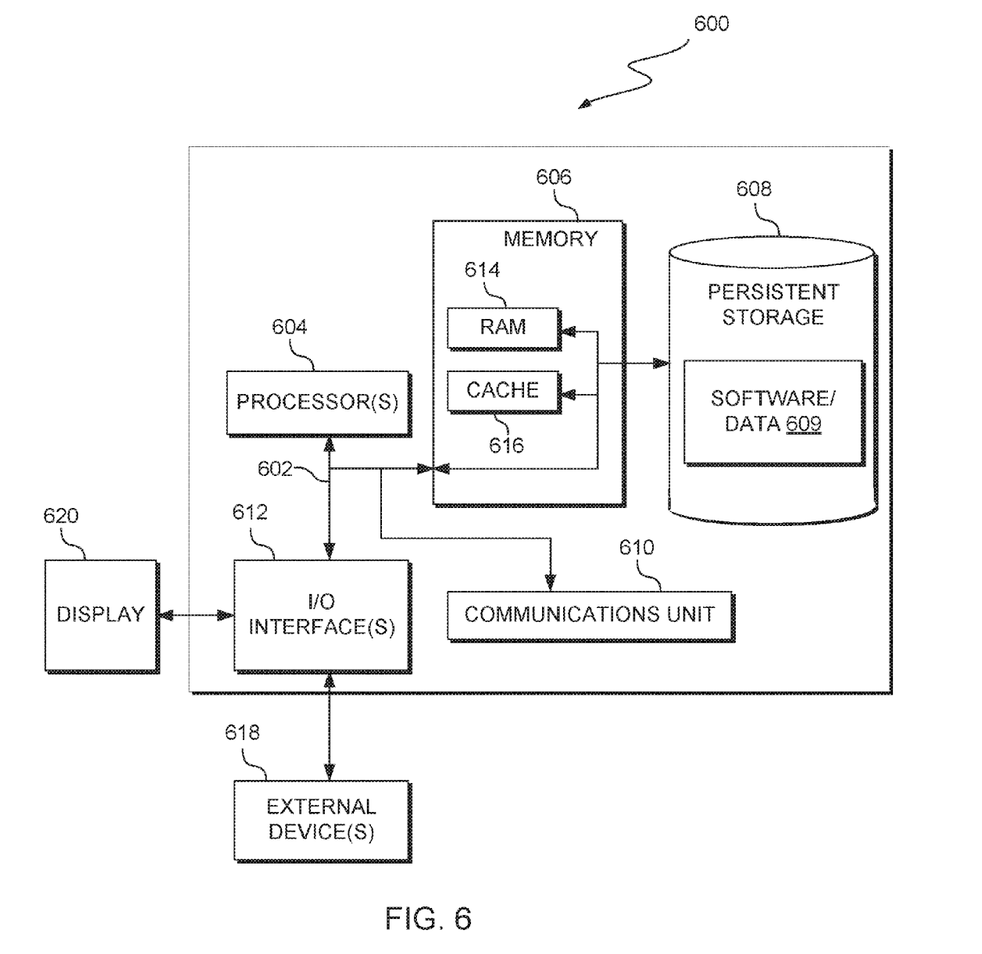
FIG. 6 depicts a block diagram of components of the computing devices of FIG. 1 executing the programs of FIG. 1, in accordance with an exemplary embodiment of the present invention.

FIG. 6 depicts a block diagram of a computer system 600, which is representative of the computer systems of FIG. 1, in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

Computer system 600 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 614 and cache memory 616. In general, memory 606 can include any suitable volatile or non-volatile computer-readable storage media.

Software/data 609 (e.g., recording analysis program 106, recording data 107, PPB program 110, professional database 112, matching analysis program 116, and/or client preference data 117) are stored in persistent storage 608 for execution and/or access by one or more of the respective computer processors 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer-readable storage medium that is also part of persistent storage 608.

Communications unit 610, in these examples, provides for communications with other data processing systems or devices, including resources of network 118. In these examples, communications unit 610 includes one or more network interface cards. Communications unit 610 may provide communications through the use of either or both physical and wireless communications links. Software/data 609 may be downloaded to persistent storage 608 through communications unit 610.

I/O interface(s) 612 allows for input and output of data with other devices that may be connected to computing devices 102, 108, and 114. For example, I/O interface 612 may provide a connection to external devices 618 such as a keyboard, keypad, a touch screen, and/or some other suitable input device, e.g., recording device(s) 104. External devices 618 can also include portable computer-readable storage media such as, for example, thumb drives, portable optical or magnetic disks, and memory cards. Software and data used to practice embodiments of the present invention (e.g., recording analysis program 106, recording data 107, PPB program 110, professional database 112, matching analysis program 116, and client preference data 117) can be stored on such portable computer-readable storage media and can be loaded onto persistent storage 608 via I/O interface(s) 612. I/O interface(s) 612 also connect to a display 620.

Display 620 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) such as "Smalltalk" and the like may be subject to trademark rights in various jurisdictions throughout the world and are used here only in reference to the products or services properly denominated by the marks to the extent that such trademark rights may exist.

What is claimed is:

1. A computer program product comprising:
one or more non-transitory computer-readable storage media and program instructions stored on at least one of the one or more non-transitory computer-readable storage media, the program instructions comprising:
program instructions to receive recording data of a meeting between a professional and a client, wherein the recording data includes audio recording data and video recording data, and the recording data is received from one or more recording devices deployed in an environment in which the professional and the client are conversing;

program instructions to analyze the recording data to make one or more determinations of: an amount of time spent in the meeting, an amount of time the professional spoke, an amount of time the client spoke, a conversational tone, a word content, a word context, a voice intonation, a voice cadence, a voice lilt, a voice inflection, a voice volume, a body language, and a facial expression;

program instructions to identify one or more characteristics of the professional based on the one or more determinations, wherein the one or more characteristics of the professional comprises that the professional: is a good listener, takes time with the client, is direct, uses complicated language, explains a complicated subject matter in layman terms, is talkative, is loud, and is quiet;

program instructions to match the one or more characteristics of the professional to one or more preferences of an individual seeking one or more professionals;

program instructions to build a profile of the professional based on the one or more characteristics;

program instructions to store the profile of the professional in a database;

program instructions to query the individual seeking one or more professionals for the one or more preferences of the individual seeking one or more professionals;

program instructions to search the database for one or more profiles that provide a match of the one or more preferences of the individual seeking one or more professionals; and program instructions to display the one or more profiles that match the one or more preferences of the individual seeking one or more professionals.

* * * * *